Figure 1:
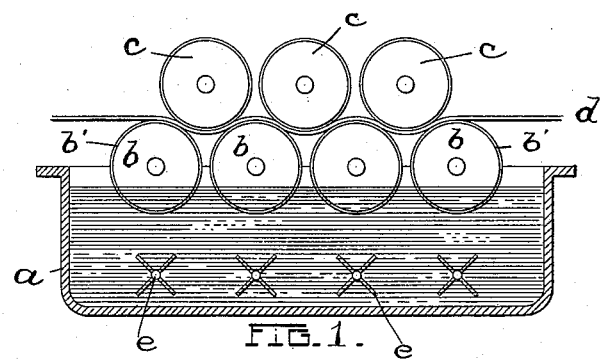

(No Model.)

G. H. WILBUR.
LAMP WICK AND ART OF PRODUCING SAME.

No. 568,822. Patented Oct. 6, 1896.

Witnesses.
Arthur F. Randall
C. E. Van Horne

Inventor.
G. H. Wilbur
by A. W. Crossley
his atty

UNITED STATES PATENT OFFICE.

GEORGE H. WILBUR, OF BOSTON, MASSACHUSETTS.

LAMP-WICK AND ART OF PRODUCING SAME.

SPECIFICATION forming part of Letters Patent No. 568,822, dated October 6, 1896.

Application filed September 20, 1895. Serial No. 563,152. (No model.)

*To all whom it may concern:*

Be it known that I, GEORGE H. WILBUR, of Boston, in the county of Suffolk and State of Massachusetts, have invented certain new and useful Improvements in Lamp-Wicks and Art of Producing the Same, of which the following is a specification.

This invention relates to lamp-wicks which have been so treated as to reduce their inflammability to a low degree and to increase the heating and illuminating quality of the flame, and also to the process by which the wick is thus treated.

It is well known to users of lamps that ordinary wicks employed either for illuminating or heating purposes burn out quickly, causing annoyance and trouble as well as expense, and also that they require careful trimming each time they are used to prevent the incrustation which reduces the brilliancy or heating quality of the flame. Again while it is desirable that the wick should be porous in order that by capillary attraction the oil may reach the point of ignition, yet at the same time it is desirable that the smallest quantity of oil which will produce the most brilliant flame should be delivered for combustion, as an excess of oil will produce a reddish light, or one that is not white.

Various attempts have been heretofore made to produce a lamp-wick which will obviate the annoyance and difficulties above referred to, and which will produce the best illuminating or heating flame. For instance, the wick has been constructed of wire-gauze around the top of the wick, but that was found impracticable and was never successfully used. Again it has been attempted to mold a sheath of carbon paste around the end of a fibrous wick, but, as is obvious, that was found to be undesirable, owing to its extreme friability and the impossibility of placing the wick in the lamp or adjusting it therein without cracking the carbon and "skinning" it off; and again it has been endeavored to saturate and coat the end of a porous wick with a mixture of plumbago and alum, but I have found that the plumbago impoverishes the flame instead of enhancing its brilliancy, owing to the impurities of foreign elements in it. It is greasy and befouls the oil and prevents it from passing through the wick in desirable quantities; and again it is practically incapable of commercial use for such a purpose, as when the wick is coated with it it cannot be handled without besmearing the fingers and filling the air with a noxious dust. In fact its use in such a manner is practically barred by the fact of its being incapable of being handled and of the evil results incident to leaving uncovered a wick coated with it, and a wick thus impregnated has never been found merchantable or practicable. It is desirable, however, that the wick should be impregnated with some incombustible material which can be worked into its meshes without rendering it unfit for being handled, and which will obstruct the flow of the oil to just that extent which will allow only the sufficient quantity to be fed to the flame to produce a white light of the greatest illuminating and heat-giving quality. It has been found that if ground or powdered pure carbon, such as coke-carbon or its equivalent, (as contradistinguished from plumbago,) be employed to impregnate the wick the most desirable results may be obtained.

It has been heretofore attempted to produce a carbonized wick by incorporating powdered carbon into yarn and then weaving the latter into a wick; and while this attempt has been in a measure successful, yet it has not been wholly so for the reason that the wick produced by such a process is not carbonized to that extent which is desirable or necessary. In the production of a wick from yarn which has been impregnated with carbon the threads or yarn must be woven together and subjected to the beating action of the lathe and other parts of the loom. This is so violent as to practically free the threads from all the particles of carbon, so that by the time the finished wick is produced it is substantially without carbon.

I have discovered and mined a new mineral which is termed "cranstonite," and which is best adapted for the impregnation of the wick. It is a comparatively pure carbonaceous indestructible insoluble material, which, when tested for over six hours on an iron plate heated to a cherry-red by a gas-flame united with oxygen blown on by a fan revolving six thousand five hundred times a minute, did not change in any degree in color or sensibly evaporate. This cranstonite is best adapted for impregnating wicks, and by actual test saves at least fifteen per cent. of oil less than consumed by the ordinary plain wick; and I have further found that if the wick be merely saturated with a mixture of cranstonite and water the carbon particles, not being soluble, will not enter into its meshes in sufficient quantities, but it will be merely coated with them; and hence I am led to employ some device by which the particles of cranstonite are mechanically forced and worked into the meshes of the wick and between its fibers. In this way, by first weaving or otherwise forming the wick of untreated material and then mechanically forcing powdered carbon or cranstonite into the meshes and fibers of the otherwise finished wick, an article can be produced which has just the sufficient amount of carbon worked therein to produce the best illuminating or heat-producing flame.

My invention consists of an art of manufacturing incombustible lamp-wicks as hereinafter fully described, and particularly pointed out in the appended claims.

Reference is to be had to the accompanying drawings, and to the letters marked thereon, forming a part of this specification, the same letters designating the same parts or features, as the case may be, wherever they occur.

Figure 3:
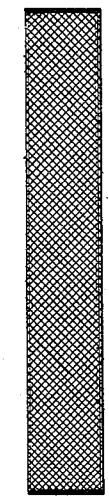
Figure 2:
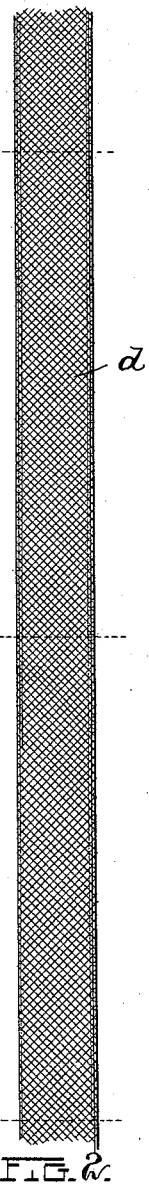

Of the drawings, Figure 1 is a side view showing conventionally a device which may be employed for assisting in the process of impregnating the wick. Fig. 2 shows a strip of fibrous material after it has been treated and is ready to be cut into wicks. Fig. 3 shows a finished wick.

In the process of making a cranstonite-impregnated wick I take a long strip of loosely-woven or braided wick material formed of untreated threads or yarns, and, as aforesaid, force into its meshes and between its fibers a quantity of finely-ground or pulverized cranstonite or its equivalent. In order that the particles may be incorporated with the wick, I grind or crush a quantity of cranstonite to a fine powder and mix it with water and some suitable adhesive material in a suitable tank or receptacle. (Indicated by $a$ in the drawings.) Mounted half in and half out of the mixture is a series of rolls $b$, which are covered with several thicknesses $b'$ of felt or equivalent material.

Above the first set of rolls I mount a second set of rolls $c\ c$, which may be arranged as shown, that is, each roll $c$ may be placed so as to have its peripheral surface in close proximity with two of the rolls $b\ b$ and with the vertical plane of its axis midway between the axis of the rolls $b$. The rolls $c$ are also covered with felt or equivalent material. The strip $d$ of wick material is fed in between the rolls $c$ and $d'$ and the latter are rotated by any suitable power devices. The water and the particles of cranstonite suspended in it are carried up by the rolls $c$, and the rolls force and work the particles into the meshes of the fabric. The rough surface of the felt covering for the rolls catches the particles and greatly assists depositing them on the surface of the fabric and in forcing them in between the fibers of the strip. In order to keep the particles of cranstonite suspended in the water and prevent them from collecting in the bottom of the receptacle, I employ continuously-operating agitating devices $e$, which act to throw up the particles of cranstonite toward the rolls. As many rolls as are necessary may be employed, each roll assisting in working more of the pulverized or ground cranstonite into the strip $d$. Sometimes it is also desirable to let the mixture of water and ground and pulverized cranstonite drip from above down onto the fabric, so that the particles may be forced in, as above described. After the strip $d$ has been thoroughly permeated and impregnated with the cranstonite it may be wound on a heated drum or dried by any other means and then cut into convenient lengths. After being cut into lengths suitable for single wicks one or both ends of each is singed, so as to be ready for use, or they may be cut by a heated tool, so as to singe during the process of cutting. The object of singeing the end of the wick is to permit of its being lighted immediately without the necessity of first trimming it, as all projections are removed, and the flame is rendered even and very bright. Generally after the wick material has been impregnated with the cranstonite I find it desirable to wash or brush it, so as to remove the surplus cranstonite with which it is covered, so that the wicks may be employed without danger of fouling the oil and handled without smearing the fingers.

By the process just described a wick is produced which substantially meets the requirements of a perfect wick in that it is non-combustible to a high degree and delivers the oil to the flame in such way that the latter has great brilliancy and illuminating capacity.

Having thus explained the nature of the invention and described a way of constructing and using the same, though without attempting to set forth all of the forms in which it may be made or all of the modes of its use, it is declared that what is claimed is—

1. The herein-described art of producing lamp-wicks, which consists in constructing a long strip of untreated wick fabric, mechanically working and forcing particles of carbon suspended in a liquid into the meshes and between the fibers thereof, drying the said strip, brushing the said strip to free it from surplus carbon, cutting it into convenient lengths, and singeing one end of each of the wicks thus formed.

2. The herein-described art of producing lamp-wicks which consists in constructing a long strip of untreated wick fabric, passing the same between rolls, some of which are suspended in a mixture of liquid and carbon, whereby the strip is impregnated with carbon, drying the said strip, brushing the latter to remove the surplus carbon therefrom, and finally cutting it into convenient lengths.

In testimony whereof I have signed my name to this specification, in the presence of two subscribing witnesses, this 16th day of August, A. D. 1895.

GEORGE H. WILBUR.

Witnesses:
MARCUS B. MAY,
C. E. VAN HORNE.